US008598063B2

(12) United States Patent
Sato et al.

(10) Patent No.: US 8,598,063 B2
(45) Date of Patent: Dec. 3, 2013

(54) CATALYST FOR FISCHER-TROPSCH SYNTHESIS AND METHOD FOR PRODUCING HYDROCARBONS

(75) Inventors: Kazuhito Sato, Satte (JP); Shigenori Nakashizu, Satte (JP)

(73) Assignee: Cosmo Oil Co., Ltd., Tokyo (JP)

( * ) Notice: Subject to any disclaimer, the term of this patent is extended or adjusted under 35 U.S.C. 154(b) by 343 days.

(21) Appl. No.: 13/000,915

(22) PCT Filed: May 15, 2009

(86) PCT No.: PCT/JP2009/059076
§ 371 (c)(1),
(2), (4) Date: Dec. 22, 2010

(87) PCT Pub. No.: WO2009/157260
PCT Pub. Date: Dec. 30, 2009

(65) Prior Publication Data
US 2011/0112206 A1 May 12, 2011

(30) Foreign Application Priority Data

Jun. 24, 2008 (JP) .............................. 2008-164458
Mar. 23, 2009 (JP) .............................. 2009-070113

(51) Int. Cl.
*B01J 21/18* (2006.01)
*B01J 27/20* (2006.01)
*B01J 23/32* (2006.01)
*B01J 23/40* (2006.01)
*B01J 23/42* (2006.01)
*B01J 23/58* (2006.01)
*C07C 27/00* (2006.01)
*C07C 27/06* (2006.01)

(52) U.S. Cl.
USPC ........... 502/174; 502/324; 502/326; 502/330; 518/715; 518/717

(58) Field of Classification Search
USPC .......... 502/174, 324, 326, 330; 418/715, 717; 518/715, 717
See application file for complete search history.

(56) References Cited

U.S. PATENT DOCUMENTS

| 3,925,535 | A |   | 12/1975 | Belliot et al. |         |
|-----------|---|---|---------|----------------|---------|
| 4,161,492 | A |   | 7/1979  | Weissel        |         |
| 4,206,134 | A | * | 6/1980  | Kugler et al.  | 518/715 |
| 4,332,914 | A | * | 6/1982  | Knifton        | 518/700 |
| 4,590,307 | A |   | 5/1986  | Bennett, Jr. et al. |    |
| 4,728,672 | A | * | 3/1988  | Yoshinari et al. | 518/717 |
| 5,296,435 | A | * | 3/1994  | Kitaguchi et al. | 502/174 |
| 5,545,674 | A |   | 8/1996  | Behrmann et al. |       |
| 5,733,839 | A |   | 3/1998  | Espinoza et al. |       |
| 7,612,013 | B2 | * | 11/2009 | Sato et al.   | 502/325 |
| 2002/0188031 | A1 | * | 12/2002 | Kibby       | 518/715 |
| 2004/0097746 | A1 | * | 5/2004  | Dugal et al. | 549/533 |
| 2004/0157938 | A1 |   | 8/2004  | Iwamoto et al. |      |
| 2011/0112205 | A1 | * | 5/2011  | Steiner et al. | 518/721 |
| 2012/0208905 | A1 | * | 8/2012  | Sato et al.   | 518/715 |

FOREIGN PATENT DOCUMENTS

| EP | 0167215 A2    | 1/1986  |
|----|---------------|---------|
| EP | 1408099 A1    | 4/2004  |
| GB | 1511124       | 5/1978  |
| JP | 60-146835 A   | 8/1985  |
| JP | 61-200856 A   | 9/1986  |
| JP | 03-502067 A   | 5/1991  |
| JP | 3-70691 B2    | 11/1991 |
| JP | 3-70692 B2    | 11/1991 |
| JP | 2002-161279 A | 6/2002  |
| JP | 2004-196874 A | 7/2004  |
| JP | 2005-530881 A | 10/2005 |

OTHER PUBLICATIONS

"Hydrothermal synthesis of MnCO3 nanorods and their thermal transfromation into Mn2O3 and Mn3O4 nanorods with single crystalline structure," Xiaoping Shen et al. Journal of Alloys and Compounds 509 (2011), pp. 5672-5676.*
"Activity and deactivation nature of Ru/MnCO3 catalysts for Fischer-Tropsch reaction," Isao Takahara et al. Applied Catalysis A: General 450 (2013), pp. 80-87.*
Office Action dated Jul. 2, 2012 in Chinese Application No. 200980124166.1.
"C1 Chemistry" compiled by Catalyst Society of Japan, Kodansha Ltd., Apr. 1, 1984; p. 25.
International Search Report for PCT/JP2009/059076 dated May 15, 2009 [PCT/ISA/210].
Extended European search report issued Nov. 3, 2011 by the European Patent Office in counterpart European Patent Application No. 09769970.6.

* cited by examiner

Primary Examiner — Patricia L Hailey
(74) Attorney, Agent, or Firm — Sughrue Mion, PLLC

(57) ABSTRACT

A catalyst for FT synthesis which, in the FT method, is high in a CO conversion and small in the formation of a gaseous component and can stably perform an FT synthesis reaction and enhance the productivity of hydrocarbons, and a method for producing hydrocarbons using the catalyst, are provided. A catalyst for Fischer-Tropsch synthesis comprising a support containing manganese carbonate as a main component, wherein the support contains at least one metal having an activity to the Fischer-Tropsch reaction; and a method for producing hydrocarbons using this catalyst.

12 Claims, No Drawings

CATALYST FOR FISCHER-TROPSCH SYNTHESIS AND METHOD FOR PRODUCING HYDROCARBONS

This is a 371 of International Application PCT/JP2009/059076 filed May 15, 2009, which claims priority to Japanese Application No. 2008-164458 filed Jun. 24, 2008 and Japanese Application No. 2009-070113 filed Mar. 23, 2009, the above-noted applications being incorporated herein by reference in their entirety.

TECHNICAL FIELD

The present invention relates to a catalyst for Fischer-Tropsch synthesis for producing hydrocarbons from a mixed gas containing hydrogen and carbon monoxide (hereinafter referred to as "syngas") as main components and a method for producing hydrocarbons using the subject catalyst. More specifically, the invention relates to a catalyst comprising a support containing manganese carbonate as a main component, wherein the support contains a metal having activity to the Fischer-Tropsch reaction (hereinafter referred to as "FT active metal") incorporated thereinto; and a method for producing hydrocarbons such as naphtha, kerosene, a diesel fuel and a wax by bringing a syngas into contact with the subject catalyst.

BACKGROUND ART

As methods for synthesizing hydrocarbons from a syngas, the Fischer-Tropsch reaction, a methanol synthesis reaction, an oxygen-containing $C_2$ (ethanol, aldehyde, etc.) synthesis reaction and the like are well known. And it is known that the Fischer-Tropsch reaction proceeds with a catalyst containing, as an active metal, an iron group element such as iron, cobalt and nickel, or a platinum group element such as ruthenium and the like; the methanol synthesis reaction proceeds with a copper based catalyst; and the oxygen-containing $C_2$ synthesis reaction proceeds with a rhodium based catalyst (see, for example, Non-Patent Document 1).

Incidentally, in recent years, a diesel fuel of a low sulfur content has been desired from the viewpoint of air environmental conservation, and it may be considered that this trend still more increases hereafter. Moreover, from the viewpoint that crude oil resources are limited or from the standpoint of energy security, it is desired to develop an oil alternative fuel, and it may be considered that this development is strongly desired more and more hereafter. As a technology responding to these desires, there is GTL (gas to liquids) which is a technology for synthesizing liquid fuels such as kerosene and diesel fuel and the like from a natural gas (main component: methane) whose proven reserves are said to be comparable to a crude oil in terms of energy.

The natural gas does not contain a sulfur content; or even if it contains a sulfur content, the sulfur content is hydrogen sulfide ($H_2S$) or the like which is easy for desulfurization, and therefore, the resulting liquid fuel such as kerosene and diesel fuel and the like does not substantially contain a sulfur content and possesses an advantage that it can be utilized as a high-performance diesel fuel having a high cetane number. Thus, this GTL has recently attracted attention more and more.

As a part of the foregoing GTL, a method (hereinafter referred to as "FT method") for producing hydrocarbons from a syngas by the Fischer-Tropsch reaction (hereinafter referred to as "FT reaction") has been actively investigated. In this FT method, in order to increase a yield of hydrocarbons, it may be considered that it is effective to use a catalyst having an excellent performance whose hydrocarbon-producing ability, namely, the activity is high, the formation of a gaseous component is small, and the activity is stably exhibited over a long period of time.

Then, various catalysts for the FT reaction have hitherto been proposed. For example, there is proposed a catalyst in which an FT active metal species such as cobalt and iron is supported on a metal oxide support made of, for example, alumina, silica, silica-alumina, titania or the like (see, for example, Patent Document 1, Patent Document 2 and Patent Document 3). Moreover, as a catalyst aiming at a high selectivity to olefins, there are proposed ruthenium based catalyst such as a catalyst in which ruthenium is supported on a manganese oxide support, a catalyst in which a third component is further added to this ruthenium-supported catalyst, and the like (see, for example, Patent Document 4 and Patent Document 5).

Though these conventionally proposed catalysts exhibit correspondingly excellent selectivity to olefins and correspondingly catalytic activity in the FT method using the same, a further enhancement of the catalytic activity is being desired. In general, the higher the activity of the catalyst, the higher the productivity of a desired product per weight of the catalyst is. Thus, the use weight of the catalyst for obtaining a desired product of the same amount may be reduced, and following this, downsizing of a reactor and the like can be achieved, so that reduction of catalyst expenses or equipment expenses can be expected. Moreover, with respect to the catalyst for the FT reaction, it is desirable that the formation of a gaseous component such methane and the like in the product is small, and the yield of useful liquid hydrocarbons such as kerosene and diesel fuel is high.

BACKGROUND-ART TECHNICAL DOCUMENTS

Patent Documents

Patent Document 1: U.S. Pat. No. 5,733,839
Patent Document 2: U.S. Pat. No. 5,545,674
Patent Document 3: European Patent No. 0167215
Patent Document 4: JP-B-3-70691
Patent Document 5: JP-B-3-70692

Non-Patent Document

Non-Patent Document 1: "C1 Chemistry", complied by Catalyst Society of Japan, Kodansha Ltd., Apr. 1, 1984, page 25

SUMMARY OF THE INVENTION

Problems to be Solved by the Invention

Under the foregoing conventional circumstances, an object of the invention is to provide a catalyst for FT synthesis which, in the FT method, is high in a CO conversion and small in the formation of a gaseous component and can stably perform an FT synthesis reaction and enhance the productivity of hydrocarbons, and a method for producing hydrocarbons using the catalyst.

Means for Solving the Problems

In order to attain the foregoing object, the present inventors made extensive and intensive investigations. As a result, it has been found that a catalyst in which an FT active metal is incorporated into a support containing manganese carbonate as a main component is drastically high in the activity and small in the formation of a gaseous component, as compared with conventionally proposed catalysts using a metal oxide based support, leading to accomplishment of the invention.

Detailed mechanisms of an enhancement of the activity of the catalyst of the invention and a lowering of the formation of a gas have not been elucidated yet, but extensive and intensive investigations are being made at present. It may be conjectured that manganese carbonate as a main component of the support, or an alkali metal, which is inert to the FT reaction, acts in some form on the FT active metal species, thereby enhancing the activity and also suppressing the formation of a gas.

That is, in order to attain the foregoing object, the invention provides a catalyst for FT synthesis having the following configuration and a method for producing hydrocarbons using the catalyst.

1. A catalyst for Fischer-Tropsch synthesis comprising a support containing manganese carbonate as a main component, wherein the support contains at least one metal having an activity to the Fischer-Tropsch reaction.
2. The catalyst for Fischer-Tropsch synthesis as set forth above in 1, wherein the metal having an activity to the Fischer-Tropsch reaction is at least one member selected from ruthenium and cobalt.
3. The catalyst for Fischer-Tropsch synthesis as set forth above in 2, wherein a content of ruthenium is from 0.5 to 5% by mass in terms of a metal on the basis of the catalyst.
4. The catalyst for Fischer-Tropsch synthesis as set forth above in 2, wherein a content of cobalt is from 5 to 40% by mass in terms of a metal on the basis of the catalyst.
5. The catalyst for Fischer-Tropsch synthesis as set forth above in any one of 1 to 4, which further comprises at least one alkali metal.
6. The catalyst for Fischer-Tropsch synthesis as set forth above in 5, wherein a content of the alkali metal is from 0.05 to 3% by mass in terms of a metal on the basis of the catalyst.
7. The catalyst for Fischer-Tropsch synthesis as set forth above in 6, wherein the alkali metal is at least one member selected from sodium and potassium.
8. A method for producing hydrocarbons comprising bringing a gas containing hydrogen and carbon monoxide as main components into contact with the catalyst for Fischer-Tropsch synthesis as set forth above in any one of 1 to 7.

Advantages of the Invention

The catalyst using manganese carbonate as a support and containing an FT active metal according to the invention is high in a CO conversion and can lower a proportion of the formation of $CH_4$ or the like as a gaseous component, as compared with conventional catalysts containing alumina or silica as the support. In addition, by incorporating the alkali metal, the CO conversion can be more increased, and the proportion of the formation of a gaseous component can be lowered.

Moreover, according to the invention, a catalyst having a high catalytic activity and high productivity of hydrocarbons is provided, and effects for reducing catalyst costs and achieving downsizing of a reactor, and the like are expected.

MODES FOR CARRYING OUT THE INVENTION

The invention is hereunder described in detail.
The catalyst for Fischer-Tropsch synthesis of the invention (hereinafter also referred to as "catalyst of the invention") comprises a support containing manganese carbonate as a main component (hereinafter also referred to as "manganese carbonate support") and the FT active metal species is incorporated to the support, and further contains an alkali metal as the need arises. The catalyst of the invention and from the preparation of the subject catalyst to the method for producing hydrocarbons using the same are successively described below in detail.

<Catalyst and its Preparation>

As manganese carbonate which is a main component of the manganese carbonate support in the catalyst of the invention, industrially produced and sold materials can be used. Moreover, it can be produced by conventionally known methods. In the case of obtaining manganese carbonate by a known method, it is obtainable through a reaction between a soluble manganese salt solution and ammonium carbonate or an alkali carbonate (for example, sodium carbonate). Moreover, manganese carbonate is also obtainable through a reaction between a divalent manganese ion and a carbonate ion or a bicarbonate ion. Moreover, the manganese carbonate support may be comprised of only manganese carbonate, or it may contain other components than manganese carbonate so far as the expected effects of manganese carbonate in the invention are not impaired. Examples of such other component include inorganic oxides which are usually used as a support, such as alumina, silica-alumina and the like. Moreover, though a content of such other component can be properly set up so far as the expected effects of manganese carbonate in the invention are not impaired, in general, it is suitably from 5 to 50% by mass on the basis of the support.

Examples of the FT active metal species in the catalyst of the invention include nickel, cobalt, iron and ruthenium. Of these, ruthenium or cobalt is preferably selected as the metal species with a high activity. Moreover, such a metal species can be used singly, or can be used in admixture of two or more kinds thereof.

As one of methods for incorporating the FT active metal species into the manganese carbonate support for the purpose of preparing the catalyst of the invention, there is a method of impregnation supporting the FT active metal species on the manganese carbonate support. This impregnation supporting is hereunder described. This impregnation supporting can be carried out by a usual impregnation supporting method.

For example, the impregnation supporting can be carried out by impregnating the manganese carbonate support with an aqueous solution of a ruthenium salt or a cobalt salt, followed by drying and calcination. At that time, in the case where two or more kinds of metals are supported as the FT active metal species, for example, the impregnation supporting may be carried out by preparing an aqueous solution containing both a ruthenium salt and a cobalt salt and simultaneously impregnating the ruthenium salt and the cobalt salt, followed by drying and calcination; or by separately impregnating the respective salts step-by-step, followed by drying and calcination. The impregnation supporting method of the FT active metal species onto the manganese carbonate support is not particularly limited.

Examples of the ruthenium salt which is used for the foregoing impregnation supporting include water-soluble ruthenium salts such as ruthenium chloride, ruthenium nitrate, ruthenium acetate, hexaammonia ruthenium chloride and the like. Moreover, cobalt chloride, cobalt nitrate, cobalt acetate, cobalt sulfate or cobalt formate can be preferably used as the cobalt slat.

Moreover, water-soluble salts such as chlorides, nitrates, acetates, carbonates and the like are preferable as the sodium salt or potassium salt.

In addition, an organic solvent such as an alcohol, an ether, a ketone and the like but not water can be used as a solvent of the solution of a ruthenium salt, a cobalt salt, a sodium salt or a potassium salt which is used for the impregnation supporting. In that case, a salt which is soluble in various organic solvents is selected as such a salt.

A content of ruthenium in the catalyst of the invention is preferably from 0.5 to 5% by mass, more preferably from 0.8 to 4.5% by mass, and especially preferably from 1 to 4% by mass in terms of a metal amount on the basis of the catalyst. A supported amount of ruthenium is related to the number of active sites. By regulating the supported amount of ruthenium to 0.5% by mass or more, the number of active sites can be kept, and a sufficient catalytic activity can be obtained. Moreover, by regulating the supported amount of ruthenium to not more than 5% by mass, a lowering of dispersibility of ruthenium and expression of a ruthenium species which does not have an interaction with the support component can be suppressed.

Moreover, a content of cobalt is preferably from 5 to 40% by mass, more preferably from 5 to 35% by mass, and especially preferably from 5 to 30% by mass in terms of a metal amount on the basis of the catalyst. By regulating the content of cobalt to 5% by mass or more, an effect for conspicuously enhancing the activity as the active metal is perceived. Moreover, by regulating the content of cobalt to not more than 40% by mass, in a drying step or calcination treatment step during the catalyst preparation or under a reaction condition in providing for the FT reaction, coagulation of cobalt can be suppressed, and a lowering of a specific surface area or pore volume of the catalyst can be suppressed. Furthermore, a gas formation amount in the product in the FT reaction can be suppressed.

There may be the case where the catalyst of the invention includes an alkali metal. Examples of the alkali metal species in the catalyst of the invention include lithium, sodium, potassium, rubidium and the like. Of these, sodium or potassium is preferably selected. Such an alkali metal species can be used singly, or can be used in admixture of two or more kinds thereof.

In the case of supporting the alkali metal species on the manganese carbonate support, for example, the supporting can be carried out by impregnating the manganese carbonate support with an aqueous solution of a sodium salt or a potassium salt, followed by drying and calcination. In the case of supporting two or more kinds of metals as the alkali metal species, for example, the supporting can be carried out by preparing an aqueous solution containing both a sodium salt and a potassium salt and simultaneously impregnating the sodium salt and the potassium salt, followed by drying and calcination; or by separately impregnating the respective salts step-by-step, followed by drying and calcination.

A content of the alkali metal such as sodium, potassium and the like in the catalyst of the invention is preferably from 0.05 to 3% by mass, more preferably from 0.05 to 2% by mass, and especially preferably from 0.1 to 1.5% by mass in terms of a metal amount on the basis of the catalyst. By regulating the content of sodium or potassium to 0.05% by mass or more, an effect for suppressing a formation amount of the gaseous component becomes conspicuous. Moreover, by regulating the content of sodium or potassium to not more than 3% by mass, it becomes possible to suppress the gas formation amount without lowering the FT activity.

In the case of supporting both the FT active metal species and the alkali metal species on the manganese carbonate support, the supporting order of the FT active metal species and the alkali metal species is not particularly limited.

After impregnating the manganese carbonate support with the FT active metal species or the alkali metal species, drying and calcination are carried out. At that time, drying is carried out in principle for the purpose of evaporating off water, and its temperature is preferably from 80 to 200° C., and more preferably from 100 to 150° C. By regulating the drying temperature to 80° C. or higher, evaporation of water can be sufficiently promoted, whereas when the drying temperature is not higher than 200° C., coagulation of the active metal component to be caused due to abrupt evaporation of water can be suppressed, and hence, such is preferable.

Moreover, a calcination temperature is preferably from 150 to 300° C., and more preferably from 150 to 250° C. By regulating the calcination temperature to not higher than 300° C., decomposition of manganese carbonate as the support component into manganese oxide and carbon dioxide can be suppressed. In the invention, it is essential that manganese carbonate as the support component exists in a form of a carbonate, and as specifically shown in the Comparative Examples as described later, in the case of manganese oxide, the expected effects of the invention are not obtainable. Moreover, in order to contrive to activate the FT active metal species or the alkali metal species, since a corresponding temperature is necessary, the calcination temperature is preferably the foregoing range.

Moreover, though a treatment time of drying or calcination cannot be unequivocally determined depending upon the treatment amount, it is usually from 1 to 10 hours. By regulating the treatment time to 1 hour or more, evaporation of water can be surely achieved, whereby occurrence of the matter that the activation of the FT active metal species or the alkali metal species becomes sparse can be suppressed. Moreover, even when the treatment time exceeds 10 hours, the catalytic activity is not substantially different from that in the case of not more than 10 hours, taking into consideration workability and productivity, and therefore, the treatment time is preferably not more than 10 hours. In this respect, this drying or calcination treatment may be carried out in air or in an inert gas atmosphere of nitrogen or helium or a reducing gas atmosphere of hydrogen or the like, and it is not particularly limited.

Though the foregoing calcination step is carried out for the purpose of contriving to activate the FT active metal species or the alkali metal species, besides the calcination treatment, it is also possible to achieve the activation by a treatment with an alkaline aqueous solution. The catalyst obtained by supporting the FT active metal species or the alkali metal species on the manganese carbonate support is immersed in an alkaline aqueous solution to achieve a post treatment. As the alkaline aqueous solution, ammonia water, a sodium hydroxide aqueous solution, a potassium hydroxide aqueous solution, a sodium carbonate aqueous solution, a potassium carbonate aqueous solution or the like can be used, and ammonia water can be preferably used. A concentration of the alkali in the alkaline aqueous solution is from 0.05 to 1 N, preferably from 0.05 to 0.5 N, and more preferably from 0.05 to 0.2 N. When the concentration of the alkali in the alkaline aqueous solution is less than 0.05 N, the post treatment effect becomes sparse, and even when the calcination treatment is subsequently conducted, an enhancement of the catalytic activity is not found so much. Moreover, when the concentration of the alkali in the alkaline aqueous solution exceeds 1 N, the content of an unreacted alkali increases, whereby not only such is not economical, but a water amount or a time required for a washing step increases. Though a time of the post treatment varies depending upon the concentration of the alkali, in general, it is preferably from 1 to 10 hours.

After the post treatment with the alkaline aqueous solution, washing with water is carried out to sufficiently wash away the excessive alkali, and the foregoing drying and calcination are then carried out. In this respect, this treatment with an alkaline aqueous solution may be carried out by impregnation supporting the FT active metal species or the alkali metal species on the manganese carbonate support and then drying or after calcination, and it is not particularly limited. In addition, this treatment can also be carried out with respect to a catalyst having been subjected to spray drying or a molded catalyst as described later.

Besides the foregoing impregnation supporting method, as the method for producing a catalyst obtained by incorporating the FT active metal species or the alkali metal species into the manganese carbonate support according to the invention, there is exemplified a method of preparing an aqueous slurry containing manganese carbonate and the FT active metal species or the alkali metal species and spray drying the slurry. Though a concentration of the slurry in this spray drying method is not particularly limited, when the slurry concentration is too low, precipitation of manganese carbonate is caused so that the catalyst component becomes heterogeneous, and hence, such is not preferable. Moreover, when the slurry concentration is too high, liquid feed of the slurry becomes difficult. Therefore, an appropriate slurry concentration is selected. Furthermore, at that time, for the purposes of regulating the concentration of the slurry, enhancing moldability of the catalyst and making it spherical, it is also possible to add a silica sol, alumina or the like as a binder component. At that time, an addition amount of the binder is preferably a degree such that the catalytic activity is not lowered, and it is preferably from 1 to 40% by mass, more preferably from 3 to 30% by mass, and further preferably from 5 to 20% by mass. By regulating the binder amount to 1% by mass or more, an effect from the standpoint of moldability or strength of the catalyst becomes conspicuous. Moreover, by regulating the binder amount to not more than 40% by mass, it becomes possible to suppress a lowering of the FT activity to be caused due to a lowering of the manganese carbonate content, and hence, such is preferable.

Moreover, in the case of producing a catalyst by the spray drying method, there are a method of simultaneously incorporating manganese carbonate, the FT active metal species, the alkali metal species and the binder component into the slurry and spraying it; and a method of spraying a slurry containing manganese carbonate and the binder and then adding the FT active metal species or the alkali metal species according to the foregoing impregnation supporting method. Moreover, it is preferable that the spray drying method is carried out at a temperature where an air-blowing temperature falls within the drying and calcination temperature range in the foregoing impregnation supporting method.

The catalyst obtained by the foregoing spray drying method is generally in a fine powder form having a particle size of from about 1 to 150 μm; and as a form of a reactor in the method for producing hydrocarbons according to the invention as described later, a fluidized bed, a suspended bed or a slurry bed is suitable. However, in the case of using the catalyst in a fixed bed reactor, since there is a concern that a differential pressure is generated in a fine powder form, as the shape of the catalyst, in general, an extrusion molded type, a tableted molded type and the like are preferably used. These can be molded by a general extrusion preparation method or tableting preparation method, and the manganese carbonate support or the catalyst in which the FT active metal species or the alkali metal is incorporated into the manganese carbonate support can be molded using an extrusion molding machine or a tableting molding machine. At that time, for the purpose of enhancing the moldability, binding properties or strength of the support or catalyst, a binder can be added. As the binder, an inorganic binder or an organic binder is general. As the inorganic binder, silica, alumina, titania or the like is preferable; and as the organic binder, carboxymethyl cellulose sodium, methyl cellulose and the like are exemplified.

An addition amount of the binder is preferably a degree such that the catalytic activity is not lowered, and it is preferably from 1 to 40% by mass, and more preferably from 3 to 30% by mass. By regulating the binder amount to 1% by mass or more, the moldability, binding properties, extrusion properties and strength of the catalyst become favorable. Moreover, by regulating the binder amount to not more than 40% by mass, it becomes possible to suppress a lowering of the FT activity to be caused due to a lowering of the manganese carbonate content, and hence, such is preferable.

In this respect, the catalyst is formed by incorporating the FT active metal or the alkali metal into the manganese carbonate support or the molded type of the binder-containing manganese carbonate support by the foregoing impregnation method or the like.

In addition to the above, as the method for producing a catalyst in which the FT active metal or the alkali metal is incorporated into the manganese carbonate support according to the invention, there are a method in which the manganese carbonate support or the support containing manganese carbonate and a binder as prepared by spray drying is immersed in an aqueous solution of the FT active metal species to adsorb the active metal onto the support (equilibrium adsorption method); a method in which after the support is immersed in an aqueous solution of the FT active metal species or the alkali metal species, an alkaline precipitant solution such as ammonia water and the like is added to precipitate the FT active metal or the alkali metal on the support (deposition method); and the like.

<Method for Producing Hydrocarbons>

The method for producing hydrocarbons according to the invention is carried out by providing the thus prepared catalyst of the invention for the FT reaction, namely bringing a syngas containing hydrogen and carbon monoxide as main components into contact with the subject catalyst. In the method for producing hydrocarbons according to the invention, examples of a form of a reactor of the FT reaction include a fixed bed, a fluidized bed, a suspended bed, a slurry bed and the like, and the form of the reactor is not particularly limited. As an example thereof, the method for producing hydrocarbons according to the invention by a slurry bed is hereunder described.

In the case of conducting the method for producing hydrocarbons according to the invention by a slurry bed, a shape of the catalyst is preferably spherical, and a range of the catalyst particle distribution is preferably 1 μm or more and not more than 150 μm, more preferably 5 μm or more and not more than 120 μm, and most preferably 10 μm or more and not more than 110 μm. In the case of a slurry bed reaction type, since the catalyst is used upon being dispersed in a liquid hydrocarbon or the like, by regulating a catalyst particle size to 1 μm or more, outflow of the catalyst particle into the downstream side to be caused due to excessive smallness of the particle can be suppressed, a lowering of the catalyst concentration within a reactor can be suppressed, and a hindrance of an instrument on the downstream side by the catalyst fine particle or the like can be suppressed. Moreover, by regulating the catalyst particle size within 150 μm, a lowering of the reaction activity to be caused due to the fact that the catalyst particle is not dispersed over the whole of the reactor, whereby the slurry becomes heterogeneous can be suppressed. Moreover, what the catalyst shape is not irregular but spherical is preferable because in the reaction mode of a slurry bed, the generation of a fine powder by breakage or powdering of the catalyst to be caused due to contact between catalysts each other or contact between the catalyst and an inner wall of the reactor or the like is reduced.

In the method for producing hydrocarbons according to the invention, the thus prepared catalyst of the invention is previously subjected to a reduction treatment (activation treatment) prior to providing for the FT reaction. By this reduction treatment, the catalyst is activated such that the catalyst exhibits a desired catalytic activity in the FT reaction. In the case where this reduction treatment is not conducted, the FT active metal species is not sufficiently reduced, and a desired catalytic activity is not exhibited in the FT reaction.

This reduction treatment can be preferably carried out by either a method of bringing the catalyst into contact with a reducing gas in a slurry state dispersed in a liquid hydrocarbon or a method of bringing the catalyst into contact with a reducing gas by merely passing the gas through the catalyst without using a hydrocarbon. As the liquid hydrocarbon which disperses the catalyst in the former method, various hydrocarbons including olefins, alkanes, alicyclic hydrocarbons and aromatic hydrocarbons can be used so far as they are liquid under a treatment condition. Moreover, they may be a hydrocarbon containing a hetero element such as oxygen-containing hydrocarbons, nitrogen-containing hydrocarbons and the like. The carbon number of such a hydrocarbon is not particularly limited as far as it is liquid under a treatment condition, but in general, those having from 6 to 40 carbon number are preferable, those having from 9 to 40 carbon number are more preferable, and those having from 9 to 35 carbon number are the most preferable. What the hydrocarbon has 6 carbon number or more is preferable because a vapor pressure of the solvent does not become excessively high, and a treatment condition width is not limited. Moreover, what the hydrocarbon has not more than 40 carbon number is preferable because a solubility of the reducing gas is not lowered, and a sufficient reduction treatment can be achieved.

Moreover, an amount of the catalyst to be dispersed in the hydrocarbon is suitably from 1 to 50% by mass, preferably from 2 to 40% by mass, and more preferably from 3 to 30% by mass in terms of a concentration. When the amount of the catalyst is 1% by mass or more, it is possible to prevent an excessive lowering of reduction efficiency of the catalyst from occurring. Accordingly, as a method of preventing a lowering of reduction efficiency of the catalyst, there is exemplified a method of reducing a passing amount of the reducing gas. According to this, it is possible to avoid impairment of dispersion of gas (reducing gas)-liquid (solvent)-solid (catalyst). Moreover, when the amount of the catalyst is not more than 50% by mass, the viscosity of the slurry obtained by dispersing the catalyst in the hydrocarbon does not become excessively high, dispersion of bubbles is satisfactory, and the reduction of the catalyst is sufficiently achieved; and hence, such is preferable.

Moreover, a treatment temperature of this reduction treatment is preferably from 140 to 250° C., more preferably from 150 to 200° C., and most preferably from 160 to 200° C. When the treatment temperature of the reduction treatment is 140° C. or higher, the FT active metal species and the alkali metal species are sufficiently reduced, and a sufficient reaction activity is obtainable. Moreover, when the treatment temperature of the reduction treatment is not higher than 250° C., it is possible to avoid a danger of inviting a lowering of the activity to be caused due to the fact that decomposition of manganese carbonate as the support component into manganese oxide proceeds.

For this reduction treatment, a reducing gas composed mainly of hydrogen is preferably used. The reducing gas to be used may contain other components than hydrogen, for example, steam, nitrogen, a rare gas, etc. in an amount such that the reduction is not impaired.

Moreover, though this reduction treatment is influenced by the foregoing treatment temperature and also a hydrogen partial pressure and a treatment time, the hydrogen partial pressure is preferably from 0.1 to 10 MPa, more preferably from 0.5 to 6 MPa, and most preferably from 1 to 5 MPa. Though the reduction treatment time varies depending upon the catalyst amount, the passing amount of hydrogen and the like, in general, it is preferably from 0.1 to 72 hours, more preferably from 1 to 48 hours, and most preferably from 4 to 48 hours. When the treatment time is 0.1 hours or more, it is possible to avoid the matter that the activation of the catalyst becomes insufficient. Moreover, when the treatment time is not more than 72 hours, an enhancement of the catalyst performance is sufficiently achieved.

In the method for producing hydrocarbons according to the invention, the catalyst of the invention having been thus subjected to a reduction treatment is provided for the FT reaction, namely a synthesis reaction of hydrocarbons.

In the FT reaction in the method for producing hydrocarbons according to the invention, the catalyst is made a dispersed state dispersed in a liquid hydrocarbon, and a syngas composed of hydrogen and carbon monoxide is brought into contact with the catalyst in the dispersed state. On that occasion, as the liquid hydrocarbon which disperses the catalyst, the same hydrocarbon to be used in the foregoing reduction treatment which is previously conducted can be used. That is, various hydrocarbons including olefins, alkanes, alicyclic hydrocarbons and aromatic hydrocarbons can be used so far as they are liquid under a reaction condition. They may be a hydrocarbon containing a hetero element such as oxygen-containing hydrocarbons, nitrogen-containing hydrocarbons and the like. Though the carbon number of such a hydrocarbon is not particularly limited, in general, those having from 6 to 40 carbon number are preferable, those having from 9 to 40 carbon number are more preferable, and those having from 9 to 35 carbon number are the most preferable. What the hydrocarbon has 6 carbon number or more is preferable because a vapor pressure of the solvent does not become excessively high, and a reaction condition width is not limited. Moreover, when the hydrocarbon has not more than 40 carbon number, a solubility of the reducing gas as a raw material is not lowered, and a lowering of the reaction activity can be avoided. In the foregoing reduction treatment to be previously conducted, in the case where a method of dispersing the catalyst in the liquid hydrocarbon is adopted, the liquid hydrocarbon which is used in the subject reduction treatment can be used in this FT reaction as it is.

An amount of the catalyst to be dispersed in the hydrocarbon in the FT reaction is preferably from 1 to 50% by mass, more preferably from 2 to 40% by mass, and most preferably from 3 to 30% by mass in terms of a concentration. When the amount of the catalyst is 1% by mass or more, it is possible to avoid insufficiency of the activity of the catalyst. In this respect, when the activity is insufficient, for the purpose of compensating the insufficiency of the activity, the passing amount of the syngas is reduced, and dispersion of gas (syngas)-liquid (solvent)-solid (catalyst) is impaired due to a lowering of the passing amount of the syngas. Moreover, when the amount of the catalyst is not more than 50% by mass, viscosity of the slurry in which the catalyst is dispersed in the hydrocarbon does not become excessively high, and it is possible to avoid the matter that dispersion of bubbles becomes worse so that the reaction activity is not sufficiently obtainable.

The syngas which is used in the FT reaction may be a gas containing hydrogen and carbon monoxide as main components and may be incorporated with other components which do not inhibit the FT reaction. Moreover, a rate (k) of the FT reaction depends upon the hydrogen partial pressure almost linearly, and hence, it is desirable that a partial pressure ratio of hydrogen to carbon monoxide ($H_2$/CO molar ratio) is 0.6 or more. Since this reaction is a reaction in which a decrease of volume is involved, it is preferable that a total value of partial pressures of hydrogen and carbon monoxide is high as far as possible. Though an upper limit of the partial pressure ratio of hydrogen to carbon monoxide is not particularly limited, a practical range of the partial pressure ratio is preferably from 0.6 to 2.7, more preferably from 0.8 to 2.5, and especially preferably from 1 to 2.3. When this partial pressure ratio is 0.6 or more, it is possible to prevent a lowering of the yield of the hydrocarbon to be formed. Moreover, when this partial pressure ratio is not more than 2.7, it is possible to suppress a tendency that the gaseous component and light components in the hydrocarbon to be formed increase.

Examples of other components which may be incorporated in the foregoing syngas and which do not inhibit the FT reaction include carbon dioxide. In the method for producing hydrocarbons according to the invention, a syngas into which carbon dioxide obtained by a reforming reaction of a natural gas, a petroleum products or the like can be used without any problem. Moreover, other compounds than carbon dioxide which do not inhibit the FT reaction may be incorporated, and for example, a syngas into which methane, steam, partially oxidized nitrogen or the like is incorporated and which is obtained by a steam reforming reaction or an auto-thermal reforming reaction of a natural gas, a petroleum products or the like may be used. Moreover, this carbon dioxide can also be positively added to a syngas not containing carbon dioxide. In carrying out the method for producing hydrocarbons according to the invention, when a syngas containing carbon dioxide obtained by reforming a natural gas or a petroleum product by an auto-thermal reforming method, a steam reforming method or the like is provided for the FT reaction as it is without being subjected to a decarbonation treatment for removing carbon dioxide existing therein, it is possible to reduce a facility-construction cost and a running cost required for the decarbonation treatment, so that a production cost of hydrocarbons obtained in the FT reaction can be reduced.

In the method for producing hydrocarbons according to the invention, a total pressure (total value of partial pressures of all of the components) of the syngas (mixed gas) to be provided for the FT reaction is preferably from 0.5 to 10 MPa, more preferably from 0.7 to 7 MPa, and further preferably from 0.8 to 5 MPa. When this total pressure is 0.5 MPa or more, chain growth becomes sufficient, and a lowering of the yields of a gasoline content, a kerosene and diesel fuel content and a wax content can be prevented. In view of equilibrium, though the higher partial pressures of hydrogen and carbon monoxide are advantageous, when the total pressure is not more than 10 MPa, it is possible to correspondingly suppress disadvantages from the industrial viewpoints that a plant-construction cost and the like increase, and a running cost owing to a large-sized compressor, etc. necessary for compression elevates, and the like.

In this FT reaction, in general, when an $H_2$/CO molar ratio of the syngas is the same, the lower the reaction temperature is, the higher the chain growth probability and the $C_5$+ selectivity (a proportion of products having 5 or more carbon number in the FT reaction product) are, but a CO conversion becomes low. Contrarily, when the reaction temperature is elevated, the chain growth probability and the $C_5$+ selectivity decrease, but the CO conversion increases. Moreover, when the $H_2$/CO ratio increases, the CO conversion increases, and the chain growth probability and the $C_5$+ selectivity decrease. When the $H_2$/CO ratio decreases, the results are reversed. Degrees of the effects of these factors on the reaction depend on the kind of the catalyst used or the like, but in the method of using the catalyst of the invention, the reaction temperature is suitably from 200 to 350° C., preferably from 210 to 310° C., and more preferably from 220 to 290° C. In this respect, the CO conversion is one defined according to the following expression.

[CO conversion]

$$\text{CO conversion} = [(\text{CO mole in the raw material gas per unit time}) - (\text{CO mole in the outlet gas per unit time})]/(\text{CO molar number in the raw material gas per unit time}) \times 100$$

EXAMPLES

The invention is more specifically described below with reference to the following Examples and Comparative Examples, but it should not be construed that the invention is limited to these Examples.

In the following Examples, a CO analysis was conducted on a thermal conductivity gas chromatograph (TCD-GC) using active carbon (60/80 mesh) as a separation column. In this respect, as a raw material gas, a syngas (mixed gas of $H_2$ and CO) to which Ar was added in an amount of 10% by volume as an internal standard was used. Qualitative and quantitative analyses were conducted by comparing peak positions and peak areas of CO with those of Ar. Identification of the chemical components of catalysts was conducted by ICP (CQM-10000P, manufactured by Shimadzu Corporation).

Moreover, a $CH_4$ selectivity was calculated according to the following expression.

$$CH_4 \text{ selectivity (\%)} = [(CH_4 \text{ mole in the outlet gas per unit time})/[(\text{CO mole in the raw material gas per unit time}) - (\text{CO mole in the outlet gas per unit time})] \times 100$$

Example 1

As manganese carbonate, manganese(II) carbonate n-hydrate, manufactured by Wako Pure Chemical Industries, Ltd. was used. A specific surface area measured by the $N_2$ adsorption method was 46.4 m²/g, a pore volume was 0.15 mL/g, and a pore size was 4.2 nm.

After previously drying at 150° C. for 5 hours, 4.9 g of manganese carbonate was weighed and impregnated with an aqueous solution of 0.18 g of ruthenium chloride (Ru Assay, manufactured by Kojima Chemicals Co., Ltd., 40.79% by mass) dissolved in 3.0 g of water; and after allowing to stand for one hour, the resultant was dried in air at 80° C. for 3 hours and then calcined at 150° C. for 3 hours to obtain a catalyst A.

The catalyst A was subjected to a structural analysis by X-ray diffraction. As a result, manganese kept manganese carbonate. Moreover, the catalyst A was subjected to a chemical composition analysis by ICP. As a result, ruthenium was 1.5% by mass in terms of a metal.

2.4 g of the catalyst A was charged in a reactor having an inner volume of 100 mL together with 40 mL of n-hexadecane (slurry concentration: 7.2% by weight) as a dispersion medium, and reduction was conducted for 3 hours by bringing hydrogen into contact with the catalyst A at a hydrogen partial pressure of 0.9 MPa·G at a temperature of 170° C. at a flow rate of 100 (STP) mL/min (STP: standard temperature and pressure). After the reduction, hydrogen was switched to a syngas having an $H_2/CO$ ratio of about 2 (containing about 25% by volume of Ar), and the FT reaction was conducted at a temperature of 260° C. at an ($H_2$+CO) pressure of 0.9 MPa·G.

W/F (weight/flow) [g·hr/mole] was about 11 g·hr/mole. After 20 hours from the start of the FT reaction, the CO conversion was about 51.5%, and the $CH_4$ selectivity was about 10.5%; and after 100 hours, the CO conversion was about 50.2%.

Example 2

A catalyst B was obtained in the same manner as in Example 1, except for regulating the amounts of manganese carbonate and ruthenium chloride such that the content of ruthenium was 3.0% by mass in terms of a metal.

The catalyst B was subjected to a chemical composition analysis by ICP. As a result, ruthenium was 2.9% by mass in terms of ruthenium. This catalyst B was provided for the FT reaction in the same manner as in Example 1. After 20 hours from the start of the FT reaction, the CO conversion was about 70.9%, and the $CH_4$ selectivity was 11.5%; and after 100 hours, the CO conversion was about 70.3%.

Example 3

As manganese carbonate, the same manganese(II) carbonate n-hydrate, manufactured by Wako Pure Chemical Industries, Ltd. as in Example 1 was used.

After previously drying at 150° C. for 5 hours, 4.5 g of manganese carbonate was weighed and impregnated with an aqueous solution of 2.46 g of cobalt nitrate ($Co(NO_3)_2.6H_2O$, manufactured by Wako Chemical Industries, Ltd.) dissolved in 3.0 g of water; and after allowing to stand for one hour, the resultant was dried in air at 80° C. for 3 hours and then calcined at 200° C. for 3 hours to obtain a catalyst C.

The catalyst C was subjected to a structural analysis by X-ray diffraction. As a result, manganese kept manganese carbonate. Moreover, the catalyst C was subjected to a chemical composition analysis by ICP. As a result, cobalt was 10.1% by mass in terms of a metal. This catalyst C was provided for the FT reaction in the same manner as in Example 1. After 20 hours from the start of the FT reaction, the CO conversion was about 62.4%, and the $CH_4$ selectivity was about 11.8%; and after 100 hours, the CO conversion was about 60.1%.

Example 4

A catalyst D was obtained in the same manner as in Example 3, except for regulating the amounts of manganese carbonate and cobalt nitrate such that the content of cobalt was 30% by mass in terms of a metal.

The catalyst D was subjected to a chemical composition analysis by ICP. As a result, ruthenium was 30.2% by mass in terms of cobalt. This catalyst D was provided for the FT reaction in the same manner as in Example 1. After 20 hours from the start of the FT reaction, the CO conversion was about 68.2%, and the $CH_4$ selectivity was about 20.8%; and after 100 hours, the CO conversion was about 67.1%.

Example 5

As manganese carbonate, the same manganese(II) carbonate n-hydrate, manufactured by Wako Pure Chemical Industries, Ltd. as in Example 1 was used.

After previously drying at 150° C. for 5 hours, 4.4 g of manganese carbonate was weighed and impregnated with an aqueous solution of 0.18 g of ruthenium chloride (Ru Assay, manufactured by Kojima Chemicals Co., Ltd., 40.79% by mass) and 2.46 g of cobalt nitrate ($Co(NO_3)_2.6H_2O$, manufactured by Wako Chemical Industries, Ltd.) dissolved in 3.0 g of water; and after allowing to stand for one hour, the resultant was dried in air at 80° C. for 3 hours and then calcined at 200° C. for 3 hours to obtain a catalyst E.

The catalyst E was subjected to a structural analysis by X-ray diffraction. As a result, manganese kept manganese carbonate. Moreover, the catalyst E was subjected to a chemical composition analysis by ICP. As a result, ruthenium was 1.5% by mass in terms of a metal, and cobalt was 10.1% by mass in terms of a metal. This catalyst E was provided for the FT reaction in the same manner as in Example 1. After 20 hours from the start of the FT reaction, the CO conversion was about 76.7%, and the $CH_4$ selectivity was about 35.4%; and after 100 hours, the CO conversion was about 76.2%.

Example 6

As manganese carbonate, the same manganese(II) carbonate n-hydrate, manufactured by Wako Pure Chemical Industries, Ltd. as in Example 1 was used.

After previously drying at 150° C. for 5 hours, 4.9 g of manganese carbonate was weighed and impregnated with an aqueous solution of 0.18 g of ruthenium chloride (Ru Assay, manufactured by Kojima Chemicals Co., Ltd., 40.79% by mass) dissolved in 3.0 g of water; and after allowing to stand for one hour, the resultant was dried in air at 80° C. for 3 hours.

The whole of the dried material was immersed in 100 mL of 0.05 N ammonia water and treated with an alkaline aqueous solution for about one hour by a magnetic stirrer, followed by filtration. The resultant was further washed with water and filtered. This was dried at 80° C. for 3 hours and then calcined at 150° C. for 3 hours. Subsequently, 3.0 g of the resulting calcined material was weighed and impregnated with a sodium carbonate aqueous solution of 0.007 g of sodium carbonate (manufactured by Wako Pure Chemical Industries, Ltd.) dissolved in 1.5 g of water; and after allowing to stand for one hour, the resultant was dried in air at 80° C. for 3 hours and then calcined at 150° C. for 3 hours to obtain a catalyst F.

The catalyst F was subjected to a structural analysis by X-ray diffraction. As a result, manganese kept manganese carbonate. Moreover, the catalyst F was subjected to a chemical composition analysis by ICP. As a result, ruthenium was 1.5% by mass in terms of a metal, and sodium was 0.1% by mass in terms of a metal. This catalyst F was provided for the FT reaction in the same manner as in Example 1. After 20 hours from the start of the FT reaction, the CO conversion was about 52.7%, and the $CH_4$ selectivity was about 8.1%; and after 100 hours, the CO conversion was about 51.8%.

Example 7

A catalyst G was obtained in the same manner as in Example 6, except for regulating the amounts of manganese carbonate, ruthenium chloride and sodium carbonate such that the content of ruthenium was 3.0% by mass in terms of a metal and that the content of sodium was 1.0% by mass in terms of a metal.

This catalyst G was subjected to a structural analysis by X-ray diffraction. As a result, manganese kept manganese carbonate. Moreover, the catalyst G was subjected to a chemical composition analysis by ICP. As a result, ruthenium was 3.0% by mass in terms of a metal, and sodium was 1.0% by mass in terms of a metal. This catalyst G was provided for the FT reaction in the same manner as in Example 1. After 20 hours from the start of the FT reaction, the CO conversion was about 72.4%, and the $CH_4$ selectivity was 7.8%; and after 100 hours, the CO conversion was about 72.1%.

Example 8

11.0 g of ruthenium chloride (Ru Assay, manufactured by Kojima Chemicals Co., Ltd., 40.79% by mass) was dissolved in 270 g of a silica sol (SI-550), manufactured by Shokubai Kasei Kogyo K.K.; and subsequently 210 g of a manganese carbonate dried material and 2.0 g of sodium carbonate were added and mixed. 30.0 g of methyl cellulose (MC4000, manufactured by Wako Pure Chemical Industries, Ltd.) was added, and the mixture was sufficiently kneaded in a mortar. Subsequently, an aqueous solution of 49.5 g of cobalt nitrate (manufactured by Wako Pure Chemical Industries, Ltd.) dissolved in 40.0 g of water was gradually added, and the mixture was further thoroughly kneaded. This kneaded material was extruded using an extrusion molding machine (extrusion hole diameter: 1.5 mm), and a molded article was dried at 80° C. for 3 hours and then calcined in air at 200° C. for 3 hours to obtain a catalyst H.

This catalyst H was subjected to a structural analysis by X-ray diffraction. As a result, manganese kept manganese carbonate. Moreover, the catalyst H was subjected to a chemical composition analysis by ICP. As a result, ruthenium was 1.5% by mass in terms of a metal, cobalt was 10.0% by mass in terms of a metal, and sodium was 0.3% by mass in terms of a metal. This catalyst H was pulverized and then provided for the FT reaction in the same manner as in Example 1. After 20 hours from the start of the FT reaction, the CO conversion was about 77.7%, and the $CH_4$ selectivity was 14.2%; and after 100 hours, the CO conversion was about 77.1%.

Example 9

3.50 g of manganese carbonate was weighed and impregnated with an aqueous solution of 7.5 g of cobalt nitrate dissolved in 5.0 g of water; and after allowing to stand for one hour, the resultant was dried in air at 80° C. for 3 hours and then calcined at 200° C. for 3 hours. Subsequently, 3.0 g of the resulting calcined material was weighed and impregnated with a potassium carbonate aqueous solution of 0.04 g of potassium carbonate (manufactured by Wako Pure Chemical Industries, Ltd.) dissolved in 1.5 g of water; and after allowing to stand for one hour, the resultant was dried in air at 80° C. for 3 hours and then calcined at 200° C. for 3 hours to obtain a catalyst I.

This catalyst I was subjected to a structural analysis by X-ray diffraction. As a result, manganese kept manganese carbonate. Moreover, the catalyst I was subjected to a chemical composition analysis by ICP. As a result, cobalt was 30.1% by mass in terms of a metal, and potassium was 0.8% by mass in terms of a metal. This catalyst I was pulverized and then provided for the FT reaction in the same manner as in Example 1. After 20 hours from the start of the FT reaction, the CO conversion was about 69.1%, and the $CH_4$ selectivity was 12.6%; and after 100 hours, the CO conversion was about 67.9%.

Comparative Example 1

A catalyst J was obtained in the same manner as in Example 1, except for using manganese(III) oxide ($Mn_2O_3$), manufactured by Wako Pure Chemical Industries, Ltd. in place of the manganese carbonate.

The catalyst J was subjected to a structural analysis by X-ray diffraction. As a result, manganese was $Mn_2O_3$. The catalyst J was subjected to a chemical composition analysis by ICP. As a result, ruthenium was 1.6% by mass in terms of a metal. This catalyst J was provided for the FT reaction in the same manner as in Example 1. After 20 hours from the start of the FT reaction, the CO conversion was about 31.0%, and the $CH_4$ selectivity was about 8.5%; and after 100 hours, the CO conversion was about 23.1%.

Comparative Example 2

A catalyst K was obtained in the same manner as in Example 1, except for using manganese(II) oxide (MnO), manufactured by Wako Pure Chemical Industries, Ltd. in place of the manganese carbonate.

The catalyst K was subjected to a structural analysis by X-ray diffraction. As a result, manganese was MnO. The catalyst K was subjected to a chemical composition analysis by ICP. As a result, ruthenium was 1.5% by mass in terms of a metal. This catalyst K was provided for the FT reaction in the same manner as in Example 1. After 20 hours from the start of the FT reaction, the CO conversion was about 11.2%, and the $CH_4$ selectivity was about 7.2%; and after 100 hours, the CO conversion was about 9.3%.

Comparative Example 3

In place of the manganese carbonate, 4.9 g of spherical silica (Q-30), manufactured by Fuji Silysia Chemical Ltd. which had been previously sufficiently dried was weighed and impregnated with an aqueous solution of 0.18 g of ruthenium chloride (Ru Assay, manufactured by Kojima Chemicals Co., Ltd., 40.79% by mass) dissolved in 6.1 g of water; and after allowing to stand for one hour, the resultant was dried in air at 80° C. for 3 hours and then calcined at 200° C. for 3 hours to obtain a catalyst L.

The catalyst L was subjected to a chemical composition analysis by ICP. As a result, ruthenium was 1.6% by mass in terms of a metal. This catalyst L was provided for the FT reaction in the same manner as in Example 1. After 20 hours from the start of the FT reaction, the CO conversion was about 15.7%, and the $CH_4$ selectivity was about 16.6%; and after 100 hours, the CO conversion was about 14.8%.

Comparative Example 4

In place of the manganese carbonate, 4.9 g of an aluminum oxide powder (manufactured by Pural SB, Condea) which had been previously sufficiently dried was weighed and impregnated with an aqueous solution of 0.18 g of ruthenium chloride (Ru Assay, manufactured by Kojima Chemicals Co., Ltd., 40.79% by mass) dissolved in 4.4 g of water; and after allowing to stand for one hour, the resultant was dried in air at 80° C. for 3 hours and then calcined at 200° C. for 3 hours to obtain a catalyst M.

The catalyst M was subjected to a chemical composition analysis by ICP. As a result, ruthenium was 1.5% by mass in terms of a metal. This catalyst M was provided for the FT reaction in the same manner as in Example 1. After 20 hours from the start of the FT reaction, the CO conversion was about 30.2%, and the $CH_4$ selectivity was about 21.0%; and after 100 hours, the CO conversion was about 18.9%.

Comparative Example 5

In place of the manganese carbonate, 4.5 g of spherical silica (Q-30), manufactured by Fuji Silysia Chemical Ltd. which had been previously sufficiently dried was weighed and impregnated with an aqueous solution of 2.46 g of cobalt nitrate ($Co(NO_3)_2 \cdot 6H_2O$, manufactured by Wako Chemical Industries, Ltd.) dissolved in 5.5 g of water; and after allowing to stand for one hour, the resultant was dried in air at 80° C. for 3 hours and then calcined at 200° C. for 3 hours to obtain a catalyst N.

The catalyst N was subjected to a chemical composition analysis by ICP. As a result, cobalt was 10.2% by mass in terms of a metal. This catalyst N was provided for the FT reaction in the same manner as in Example 1. After 20 hours from the start of the FT reaction, the CO conversion was about 36.2%, and the $CH_4$ selectivity was about 43.5%; and after 100 hours, the CO conversion was about 30.7%.

Comparative Example 6

A catalyst P was obtained in the same manner as in Comparative Example 5, except that the amount of spherical silica, water and cobalt nitrate were regulated such that the content of cobalt was 30% by mass.

The catalyst P was subjected to a chemical composition analysis by ICP. As a result, cobalt was 30.1% by mass in terms of a metal. This catalyst P was provided for the FT reaction in the same manner as in Example 1. After 20 hours from the start of the FT reaction, the CO conversion was about 61.6%, and the $CH_4$ selectivity was about 50.7%; and after 100 hours, the CO conversion was about 57.5%.

Comparative Example 7

In place of the manganese carbonate, 4.9 g of manganese (II) oxide (MnO), manufactured by Wako Pure Chemical Industries, Ltd. was weighed and impregnated with an aqueous solution of 0.18 g of ruthenium chloride dissolved in 3.0 g of water; and after allowing to stand for one hour, the resultant was dried in air at 80° C. for 3 hours and then calcined at 150° C. for 3 hours. Subsequently, 3.0 g of the resulting calcined material was weighed and impregnated with a sodium carbonate aqueous solution of 0.007 g of sodium carbonate (manufactured by Wako Pure Chemical Industries, Ltd.) dissolved in 1.5 g of water; and after allowing to stand for one hour, the resultant was dried in air at 80° C. for 3 hours and then calcined at 150° C. for 3 hours to obtain a catalyst Q.

The catalyst Q was subjected to a chemical composition analysis by ICP. As a result, ruthenium was 1.5% by mass in terms of a metal, and sodium was 0.1% by mass in terms of a metal. This catalyst Q was provided for the FT reaction in the same manner as in Example 1. After 20 hours from the start of the FT reaction, the CO conversion was about 11.9%, and the $CH_4$ selectivity was 6.5%; and after 100 hours, the CO conversion was about 9.6%.

The experimental results of the foregoing Examples 1 to 9 and Comparative Examples 1 to 7 are shown in Table 1 and Table 2. It is clear from Table 1 and Table 2 that the catalyst using a manganese carbonate support according to the invention and the catalyst using a manganese carbonate support and containing an alkali metal according to the invention are high in the CO conversion and low in a proportion of the formation of $CH_4$ as a gaseous component, as compared with the conventional catalyst using alumina or silica as a support and the catalyst not containing an alkali metal.

In addition, it is noted that the performance of the catalyst of the invention is stably exhibited over a long period of time. Moreover, such effects according to the invention are not perceived in the case of using a support made of manganese oxide but are revealed by using a support made of manganese carbonate.

TABLE 1

|  | Example 1 | Example 2 | Example 3 | Example 4 | Example 5 | Example 6 | Example 7 | Example 8 | Example 9 |
| --- | --- | --- | --- | --- | --- | --- | --- | --- | --- |
| Catalyst | A | B | C | D | E | F | G | H | I |
| Ru (% by mass) | 1.5 | 2.9 | — | — | 1.5 | 1.5 | 3.0 | 1.5 | — |
| Co (% by mass) | — | — | 10.1 | 30.2 | 10.1 | — | — | 10.0 | 30.1 |
| Na (% by mass) | — | — | — | — | — | 0.1 | 1.0 | 0.3 | — |
| K (% by mass) | — | — | — | — | — | — | — | — | 0.8 |
| $MnCO_3$ (including others) | Balance | Balance | Balance | Balance | Balance | Balance | Balance | Balance | Balance |
| MnO (including others) | — | — | — | — | — | — | — | — | — |
| $SiO_2$ (including others) | — | — | — | — | — | — | — | 18.1 | — |
| $Al_2O_3$ (including others) | — | — | — | — | — | — | — | — | — |
| FT reaction results |  |  |  |  |  |  |  |  |  |
| CO conversion after 20 hours from the start of reaction (%) | 51.5 | 70.9 | 62.4 | 68.2 | 76.7 | 52.7 | 72.4 | 77.7 | 69.1 |
| $CH_4$ selectivity after 20 hours from the start of reaction (%) | 10.5 | 11.5 | 11.8 | 20.8 | 35.4 | 8.1 | 7.8 | 14.2 | 12.6 |
| CO conversion after 100 hours from the start of reaction (%) | 50.2 | 70.3 | 60.1 | 67.1 | 76.2 | 51.8 | 72.1 | 77.1 | 67.9 |

TABLE 2

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Catalyst | J | K | L | M | N | P | Q |
| Ru (% by mass) | 1.6 | 1.5 | 1.6 | 1.5 | — | — | 1.5 |
| Co (% by mass) | — | — | — | — | 10.2 | 30.1 | — |
| Na (% by mass) | — | — | — | — | — | — | 0.1 |
| K (% by mass) | — | — | — | — | — | — | — |
| $Mn_2CO_3$ (including others) | Balance | — | — | — | — | — | — |
| MnO (including others) | — | Balance | — | — | — | — | Balance |
| $SiO_2$ (including others) | — | — | Balance | — | Balance | Balance | — |
| $Al_2O_3$ (including others) | — | — | — | Balance | — | — | — |
| FT reaction results | | | | | | | |
| CO conversion after 20 hours from the start of reaction (%) | 31.0 | 11.2 | 15.7 | 30.2 | 36.2 | 61.6 | 11.9 |
| $CH_4$ selectivity after 20 hours from the start of reaction (%) | 8.5 | 7.2 | 16.6 | 21.0 | 43.5 | 50.7 | 6.5 |
| CO conversion after 100 hours from the start of reaction (%) | 23.1 | 9.3 | 14.8 | 18.9 | 30.7 | 57.5 | 9.6 |

The present application is based on a Japanese patent application filed on Jun. 24, 2008 (Japanese Patent Application No. 2008-164458) and a Japanese patent application filed on Mar. 23, 2009 (Japanese Patent Application No. 2009-070113), and the contents are incorporated herein by reference.

INDUSTRIAL APPLICABILITY

By utilizing the catalyst for FT synthesis according to the invention and the method for producing hydrocarbons using the subject catalyst for FT synthesis according to the invention, hydrocarbons which are low in a gaseous component such as methane and the like and rich in a kerosene fraction and a diesel fuel fraction can be produced from a syngas.

The invention claimed is:

1. A catalyst for Fischer-Tropsch synthesis comprising a support containing manganese carbonate as a main component, wherein the support contains at least one metal having an activity to the Fischer-Tropsch reaction.

2. The catalyst for Fischer-Tropsch synthesis according to claim 1, wherein the metal having an activity to the Fischer-Tropsch reaction is at least one member selected from the group consisting of ruthenium and cobalt.

3. The catalyst for Fischer-Tropsch synthesis according to claim 2, wherein a content of ruthenium is from 0.5 to 5% by mass in terms of a metal on the basis of the catalyst.

4. The catalyst for Fischer-Tropsch synthesis according to claim 3, which further comprises at least one alkali metal.

5. The catalyst for Fischer-Tropsch synthesis according to claim 2, wherein a content of cobalt is from 5 to 40% by mass in terms of a metal on the basis of the catalyst.

6. The catalyst for Fischer-Tropsch synthesis according to claim 5, which further comprises at least one alkali metal.

7. The catalyst for Fischer-Tropsch synthesis according to claim 2, which further comprises at least one alkali metal.

8. The catalyst for Fischer-Tropsch synthesis according to claim 1, which further comprises at least one alkali metal.

9. The catalyst for Fischer-Tropsch synthesis according to claim 8, wherein a content of the alkali metal is from 0.05 to 3% by mass in terms of a metal on the basis of the catalyst.

10. The catalyst for Fischer-Tropsch synthesis according to claim 9, wherein the alkali metal is at least one member selected from the group consisting of sodium and potassium.

11. A method for producing hydrocarbons comprising bringing a gas containing hydrogen and carbon monoxide as main components into contact with the catalyst for Fischer-Tropsch synthesis according to any one of claims 1 to 10.

12. A method for producing hydrocarbons comprising bringing a gas containing hydrogen and carbon monoxide as main components into contact with the catalyst for Fischer-Tropsch synthesis according to any one of claims 7 to 6.

* * * * *